[11] 3,633,424

[72] Inventors Lawrence W. Lynnworth
  Waltham;
  Brian J. Spencer, Billerica, both of Mass.
[21] Appl. No. 860,938
[22] Filed Sept. 25, 1969
[45] Patented Jan. 11, 1972
[73] Assignee Panametrics, Inc.
  Waltham, Mass.

[54] MAGNETOSTRICTIVE ULTRASONIC TRANSDUCER
  17 Claims, 10 Drawing Figs.
[52] U.S. Cl. .................................................. 73/339 A,
  73/67.8, 73/290 V, 310/26
[51] Int. Cl. .................................................. G01k 11/24
[50] Field of Search .................................. 73/330 A,
  290 V, 67.8; 310/26

[56] References Cited
  UNITED STATES PATENTS
  3,487,690  1/1970  Bell et al. ........................ 73/339 A
  3,540,265  11/1970 Lynnworth ..................... 73/339 A X
  2,647,948  8/1953  Roberts et al. .................. 310/26 X
  2,930,911  3/1960  Halliday et al. ................. 310/26
  3,015,708  1/1962  Mason ............................ 310/26 X
  3,229,523  1/1966  Boyd et al. ...................... 73/290 V
  FOREIGN PATENTS
  1,035,763  7/1966  Great Britain ................... 73/339 A
  OTHER REFERENCES
  NASA Tech. Brief 68– 10319: Ultrasonic Temperature Measuring Device, August, 1968.

*Primary Examiner*—Louis R. Prince
*Assistant Examiner*—Frederick Shoon
*Attorney*—Kenway, Jenney & Hildreth ABSTRACT: A magnetostrictive transducer in which unwanted pulses due to internal reflections are avoided by placing the energizing winding at or near one end of a magnetostrictive rod, the rod having a diameter which is small in relation to the wavelengths of the pulses being generated. The driven end of the magnetostrictive rod is supported by means providing a terminating impedance which is widely disparate from the characteristic acoustic impedance of the rod itself.

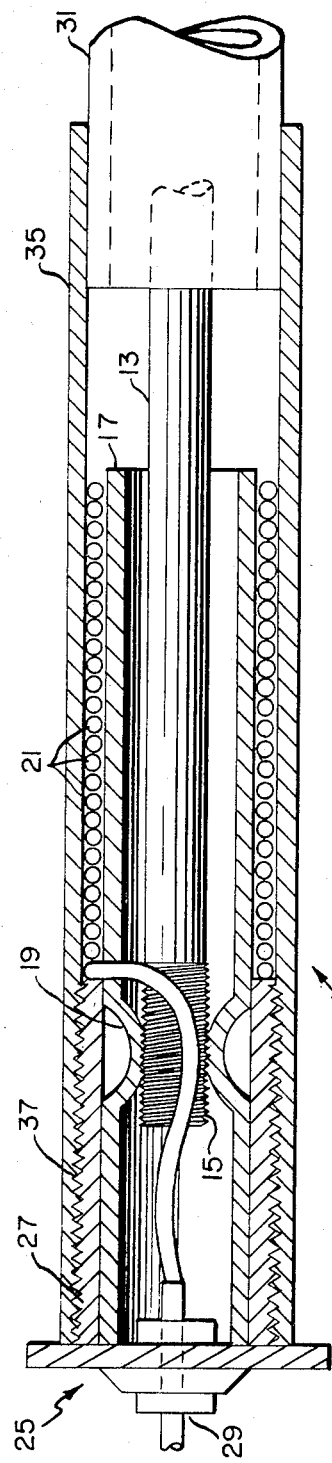
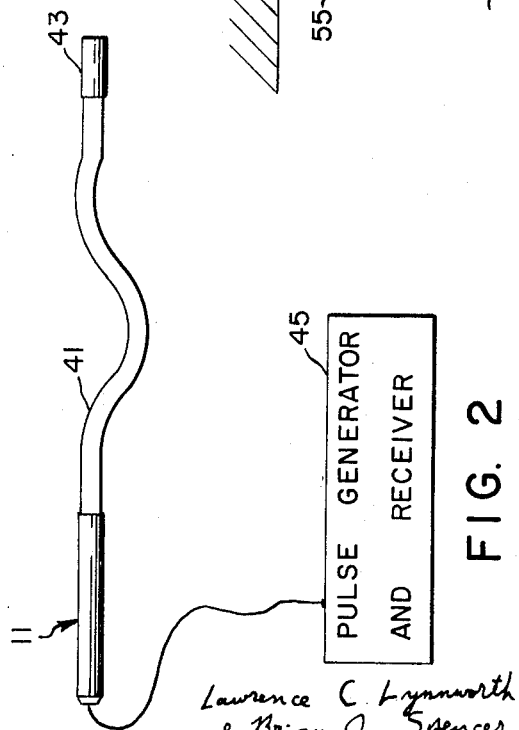

MAGNETOSTRICTIVE ULTRASONIC TRANSDUCER

BACKGROUND OF THE INVENTION

This invention relates to magnetostrictive acoustic pulse transducers and more particularly to such a transducer in which the number of unwanted pulses due to internal reflections is minimized. The invention described herein was made in the performance of work under a NASA contract and is subject to the provisions of Section 305 of the National Aeronautics and Space Act of 1958, Public Law 85-568(72 Stat. 435; 42 U.S.C. 2457).

Various sensing systems have been proposed heretofore in which variations in a given parameter, e.g., temperature, are sensed by means of the effect such changes have upon the transmission of acoustic pulses in a suitable sensor material. Interrogating pulses suitable for driving such sensors are conveniently generated by means of magnetostrictive transducers. As is understood, such acoustic pulses may be generated by applying a pulsed magnetic field to a rod of a magnetostrictive material. Such a pulsed field has typically been applied heretofore by means of a winding which is wrapped around the rod intermediate its ends and which is energized by means of a square wave electrical pulse of predetermined duration. As is also understood, energizing a magnetostrictive rod in this way in fact generates a pair of pulses travelling in opposite directions along the rod. Heretofore, it has been typical practice to absorb or dampen one of the pulses so as to prevent its being reflected from the end of the rod. The pulse travelling in the opposite direction is then coupled, through a suitable lead-in, to an acoustic sensor for generating reflection pulses which vary as a function of the value of the parameter being sensed.

In various fields, such as in very high temperature environments or in environments subject to intense radiation flux, it is difficult to find damping materials which retain their characteristics sufficiently to be effective for absorbing the unwanted acoustic pulses.

Among the several objects of the present invention may be noted the provision of a magnetostrictive transducer in which the generation of unwanted pulses is avoided; the provision of such a transducer which generates only single pulses; the provision of such apparatus in which unwanted internal reflections in the transducer are avoided; the provision of such a transducer which facilitates the detection of reflected pulses from an acoustic sensor; the provision of such apparatus which is reliable; and the provision of such apparatus which is relatively simple and inexpensive.

Other objects and features will be in part apparent and in part pointed out hereinafter.

SUMMARY OF THE INVENTION

Briefly, apparatus according to the present invention is adapted to acoustically detect variations in a given parameter by means of interrogating acoustic broadband pulses of predetermined duration. The apparatus employs a transducer rod whose transverse dimensions are substantially smaller than the wavelength of pulses of said predetermined duration in the rod and whose length is substantially greater than that wavelength. At least one end of the rod is constructed of magnetostrictive material. A terminating impedance which is widely disparate from the characteristic acoustic impedance of the rod is provided at that one end and an energizing winding is mounted coaxially with the rod at the same end for generating interrogating acoustic pulses. The coil is configured to produce a magnetic field causing transduction in a portion of the rod which is substantially within one wavelength of the one end. A sensor assembly is coupled to the other end of the rod for providing reflections of the interrogating pulses which vary as a function of the value of the parameter being sensed. As only single pulses are generated, the reflections from the sensor are substantially unobscured by any pulses reflected from the one end of the transducer rod.

BRIEF DESCRIPTION OF THE DRAWINGS

FIG. 1 is a side view in section of a magnetostrictive transducer according to the present invention employing a low-impedance termination;

FIG. 2 is a somewhat diagrammatic illustration of acoustic sensing apparatus employing the transducer of FIG. 1;

FIG. 4 is a diagrammatic illustration of another embodiment of a transducer according to this invention also employing a low-impedance termination;

Corresponding reference characters indicate corresponding parts throughout the several views of the drawings.

DESCRIPTION OF THE PREFERRED EMBODIMENTS

Figure 3:
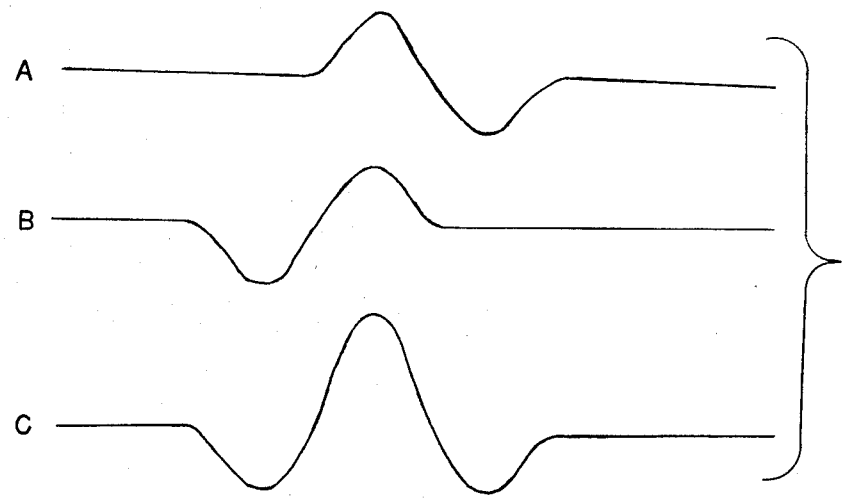
FIG. 3 represents various waveform components believed to be generated in the FIG. 1 embodiment.

Referring now to FIG. 1, the transducer illustrated there, which is designated generally by reference character 11, employs a magnetostrictive element in the form of a wire or rod 13. For reasons explained in greater detail hereinafter, the transverse dimension of this rod 13, i.e., its diameter, is substantially smaller than the wavelength of the pulses which are to be generated, while the length of the rod is longer than that wavelength.

The left-hand end of the rod 13 is threaded as indicated at 15 and is held within a tube 17. The tube is slightly crimped intermediate its ends as indicated at 19 and is internally threaded at the crimped portion for accepting the threaded end of the magnetostrictive rod 13. As the diameter of the rod 13 is small in relation to the wavelength of the pulses to be generated, it can be seen that the separation between adjacent turns of the threading 15 is also quite small in relation to this wavelength. As is explained in greater detail hereinafter, such relatively small threads do not cause any substantial dispersion of acoustic pulses within the rod 13. Preferably, there is only a relatively light engagement between the threaded parts so that contact between the end of the rod 13 and the tube 17 is at a few discrete points rather than continuous along the threaded joint. In this way, dispersion of pulses is further reduced.

The tube 17, which is preferably constructed of a substantially nonmagnetic material such as stainless steel, also serves as a form for a helical energizing winding 21. As is understood, such a helical winding produces a concentrated axial magnetic field which extends somewhat beyond the ends of the coil proper. Accordingly, it will be understood that the effective length of the winding 21 in producing magnetostriction in the rod 13 extends beyond the winding itself and encompasses the left-hand end of the rod 13. In accordance with another aspect of the present invention, the effective length of the winding 21 is approximately equal to half the wavelength of the stress pulses to be generated in the rod.

The tube 17, together with the retained magnetostrictive rod 13, is held by a fitting 25 which includes a cylindrical portion 27 adapted to receive the left-hand end of the tube 17. The fitting 25 also includes suitable feedthrough terminals 29 for providing electrical connections to the winding 21.

A protective sheath 31 is provided for protecting the portion of the wire or rod 13 which extends outside of the transducer assembly proper. Sheath 31 is bonded to a second stainless steel tube 35 which acts as a housing or cover for the transducer assembly and which threads onto the cylindrical portion 27 of the end fitting 25 as indicated at 37.

As may be seen in FIG. 2, the magnetostrictive wire or rod 13 with its sheath 31 extends beyond the region of transduction and may itself comprise an acoustic lead-in (41) for coupling acoustic pulses from the transducer to a sensor, such as indicated at 43. A conventional electronic pulse generator and receiver is indicated at 45 for generating interrogating pulses and for analyzing reflected pulses to obtain information regarding the sensed parameter. In the practice of the present invention, the type of pulses employed are short broadband pulses as opposed to bursts of essentially a single frequency. In addition to short square wave pulses, broadband pulses suitable for the practice of the present invention may be generated by the application of a step-function signal. As is understood, an extremely long square wave pulse will in fact act as a pair of step-function signals and generate a corresponding pair of acoustic pulses.

Where temperature is the parameter to be sensed, sensor 43 may merely comprise a length of rod constructed of a material in which the velocity of sound propagation varies as a function of temperature. As is understood in the art, such a sensor can be arranged so that reflections will be produced at both the interface between the lead-in and the sensor and at the end of the sensor opposite the lead-in. Thus, a pair of pulses will be received back at the transducer which are separated in time by an interval which varies as a function of the temperature of the sensor. Various other types of sensors are also known in the art. For example, in some types of ultrasonic pulse testing, the amplitudes of the reflected pulses yield information regarding the parameter being sensed. Further, if the transmission properties of the magnetostrictive material comprising the rod 13 vary as a function of the value of the parameter which is to be sensed, it is also possible to use a section of the rod 13 itself as the sensor by creating discontinuities which produce reflections. For example, a crimp in the wire or rod 13 itself will produce reflections as does the end of the wire. Accordingly, the time interval between these reflections may be used as a measure of various parameters, such as temperature, which may affect the acoustic transmission properties of the rod. In summary then, it can be seen that the transducer, the lead-in, and the sensor may all comprise respective portions of a continuous length of magnetostrictive wire.

As was noted previously, the measurement of various parameters by acoustic techniques has heretofore frequently been complicated by the generation of pulses travelling in both directions at once since the pulse initially starting in the undesired direction had to be absorbed to prevent its reflection from acting as a second interrogating pulse. By using the transducer constructed in accordance with the present invention, however, such problems are avoided. As was noted previously with reference to FIG. 1, the separations between successive turns of the threads 15 are small in relation to the wavelengths of the interrogating pulses. Thus, acoustic pulses travelling along the rod 13 are not affected by or dispersed by this means of supporting and retaining the rod. This is to be contrasted with certain prior art practices where rod diameters which were large with regard to the acoustic wavelength being used were threaded to increase wave dispersion and thereby enhance absorption thereby to produce nonreflective terminations.

As the pulses in the present transducer are not disturbed by the threads, it will be understood that the end of the wire of rod 13 is effectively terminated in free space as far as ultrasonic acoustic pulses are concerned. As is also understood, the effect of such termination is substantially that of coupling the end of the rod to an extremely low acoustic impedance, e.g., an impedance having a value of essentially zero. Such termination amounts to an acoustic short circuit and produces an amplitude reflection coefficient of minus one (−1).

The effect of this almost perfectly reflective termination is, however, not adverse due to the placement of the energizing winding substantially at the end of the magnetostrictive rod. Since the acoustic pulse is generated essentially at the very end of the magnetostrictive rod, the direct and reflected components, if they can be considered separately at all, effectively meld into a single output pulse. Typically, the main distinction which can be made between pulses generated by transducers according to the present invention and a pulse generated by a transducer which emits in both directions is that the pulse generated by the present transducer may comprise an additional half cycle. It has been found that this slight stretching of the pulse is insignificant as regards the analyzing operations to be performed since the pulse measurement can take place at any desired portion of the waveform by providing suitable clipping or threshold limiting.

The manner in which the direct and reflected components are believed to combine is illustrated in FIG. 3. The direct component is a doublet as illustrated at A while the reflected component is a doublet which, as illustrated at B is inverted with respect to the direct component due to the negative reflection coefficient present by the acoustic short circuit termination. Further, the reflected component B is somewhat delayed with respect to the direct component. Considering the absolute amplitude of each half of each doublet as being arbitrarily equal to unity, the direct component can be represented as a 1, −1 while the reflected component can be represented as a −1, 1. Due to the delay inherent in the reflected component, the two combine to effectively form a triplet −1, 2, −1 as represented at C in FIG. 2. The waveform at C corresponds closely with the pulse form actually obtained in a transducer as illustrated in FIG. 1 when the length of the coil, its position with respect to the end of the rod, and the duration of the energizing pulse are properly correlated with regard to the principles of the present invention.

It can thus be seen that the mode of operation of the present transducer, which employs a highly reflective termination, is completely opposite that provided in typical prior art devices in which pulses emitted in the unwanted direction are efficiently coupled, e.g., by matching impedances, into a lossy medium where they are dissipated.

FIG. 4 illustrates an alternative method of supporting the transducer end of a magnetostrictive rod for effectively providing an acoustic short circuit. In this construction, a magnetostrictive wire or rod 51 is bent or crimped sharply to provide a right-angle turn as indicated at 53. The transverse section, designated 55, is then firmly supported or mounted by any convenient means as indicated at 57. An energizing winding 61 is then placed around the main section of the rod 51 essentially at its supported end. As with the previous example, the effective length of the winding 61 is generally equal to one-half of the wavelength of the interrogating pulses which are to be generated in the rod 51. As is understood by those skilled in the art, an abrupt bend such as that indicated at 53 is essentially equivalent to terminating the rod at that point in free space, the transverse section 55 being ineffective to contribute any impedance to extensional waves travelling along the main portion of the magnetostrictive rod 51. Accordingly, essentially perfect reflection is provided at the bend 53. Thus, by energizing the winding 61 with a suitable square wave electric pulse, what is effectively a single acoustic pulse is generated and transmitted down the main portion of the rod 51.

As is understood by those skilled in the art, substantially complete reflection of an acoustic pulse may also be provided by terminating the end of an acoustic transmission path, e.g., a rod or wire, with relatively "infinite" acoustic impedance (i.e., at least 10 times the impedance of the magnetostrictive rod portion). Such a terminating impedance may, for example, be constituted by a relatively massive block of a dense, rigid material. In this case, of course, the reflection coefficient is substantially equal to plus one (+1) and thus a slightly different waveform results. However, the composite waveform is still essentially a unitary entity as far as the sensing and the analysis of reflections is concerned.

Figure 5:
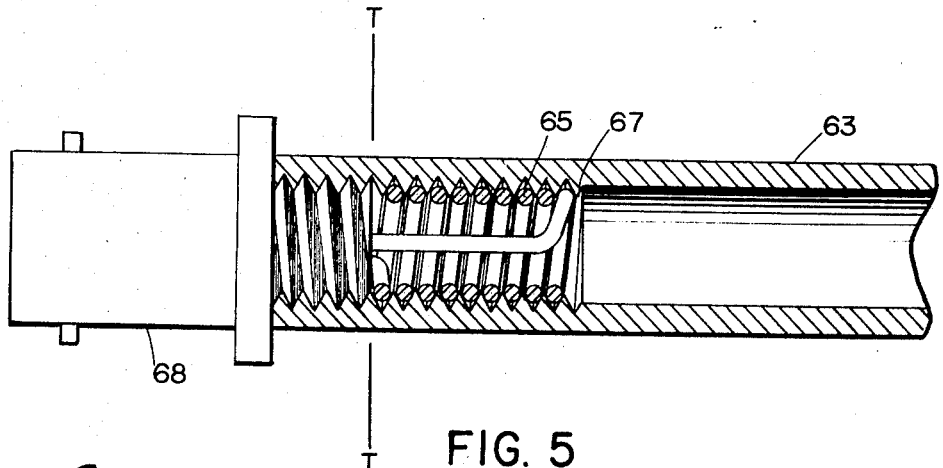
FIG. 5 is a side view in section of another embodiment employing a high-impedance termination.

A particularly compact form of transducer employing such high-impedance-type termination is illustrated in FIG. 5. In this device, the transducer rod is in the form of a tube 63. Tube 63 is relatively thin walled so as to have a relatively low acoustic impedance. A helical coil 65 is mounted within the tube for applying a longitudinal magnetic field to the portion of the tube at one end. The effective length of the coil is again preferably substantially equal to half a wavelength. The interior surface of the tube is threaded, as indicated at 67, and a conventional connector 68 is tightly threaded into the tube so as to provide relatively good acoustic coupling between the tube and the connector. Connector 68 is preferably relatively heavy so as to constitute a high-acoustic-impedance termination for the tube and thereby provide a reflection coefficient substantially equal to plus one (+1). The line T—T indicates the effective division between the operative end of the transducer rod or tube and the termination.

Preferably, the turns of the coil 65 are placed within the interior threads in the tube as illustrated so as to provide maximum magnetic coupling between the coil and the magnetostrictive material of the tube. If desired, a bias magnet can be placed inside the coil to improve the efficiency of transduction. As is understood in the art, such a biasing magnetic field is useful with some magnetostrictive materials and it should be understood that such biasing provision may be included in various of the embodiments disclosed herein, though not expressly described.

Figure 6:
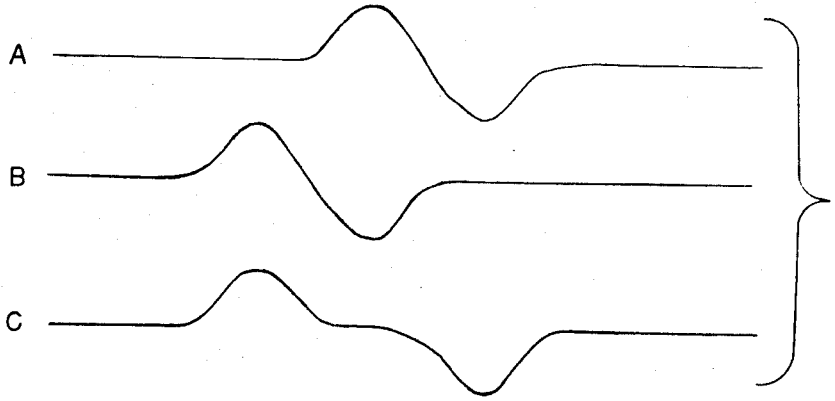
FIG. 6 represents various waveforms believed to be generated in the FIG. 5 embodiment.

When the winding 65 is energized by a broadband pulse waveform, the direct waveform (represented at A in FIG. 6) is essentially the same as that generated in the FIG. 1 embodiment. With a positive reflection coefficient, however, the reflected component (represented at B in FIG. 6) is not inverted with respect to the direct component, though it is delayed as in the previous explanation. Accordingly, the reflected component (+1, −1) and the direct component (+1, −1) combine to produce a waveform (+1, 0, −1) as represented at C in FIG. 6.

Figure 7:
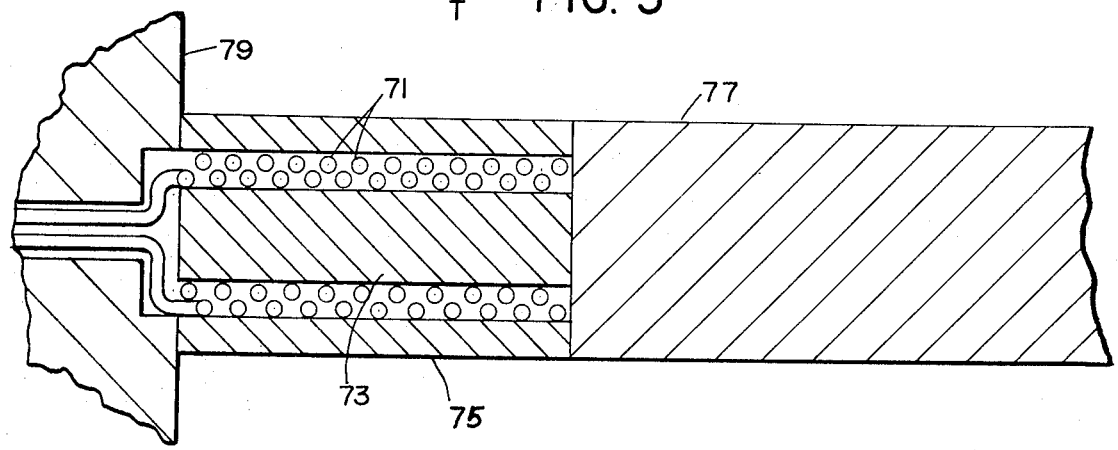
FIG. 7 is a side view in section of an embodiment employing both high- and low-terminating impedances in respective transducer sections.

The transducer illustrated in FIG. 7 employs reflective terminating impedances of both types arranged to effect cancellation of components of the wave triplets described earlier. In this transducer, an energizing winding 71 is coaxial with and operates on both a central magnetostrictive core 73 and a cylindrical magnetostrictive shell 75. Both the core and the shell are acoustically coupled to a lead-in rod 77. The core 73 is terminated in free space as illustrated to provide a reflection coefficient substantially equal to minus one (−1) as explained previously with reference to FIG. 1. The shell 65 on the other hand is terminated by a dense, massive block as indicated at 79 to provide a reflection coefficient of substantially equal to plus one (+1) as explained previously with respect to FIG. 5.

Figure 8:
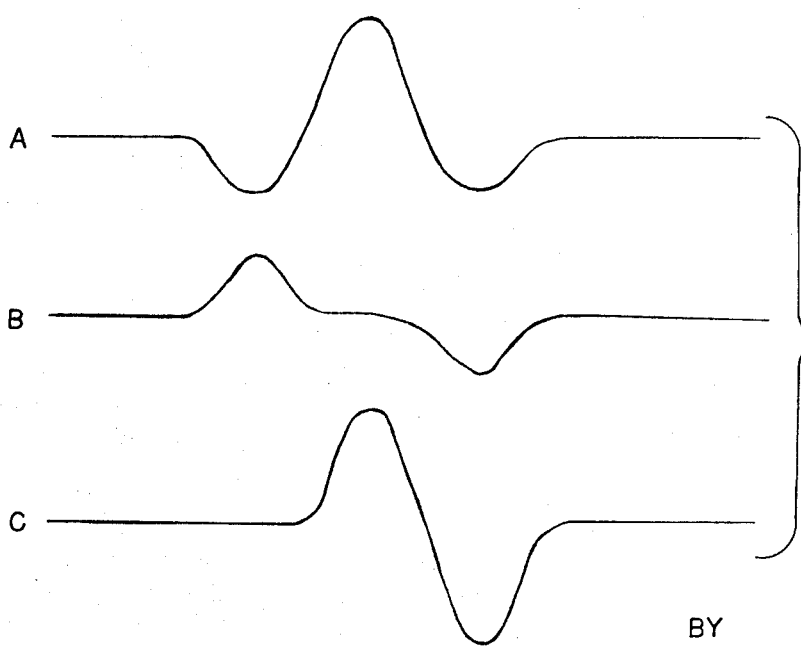
FIG. 8 represents various waveforms believed to be generated in the FIG. 7 embodiment.

At the common junction of the core 73 and the shell 75 with the lead-in 77, the core waveform (A in FIG. 8) combines with the shell waveform (B in FIG. 8) to produce a doublet (0, +2, −2) as represented at C in FIG. 8, this being a relatively easily detected waveform.

The principle of the present invention can also be extended to magnetostrictive transducers which produce waves in other than the extensional mode produced by the transducers thus far illustrated. For example, a Joule-Wiedemann transducer capable of producing both extensional and torsion waves can be constructed at the end of a transducer rod and both types of wave can be generated without unwanted reflections by following the present invention. Due to the different velocities of propagation, the exact optimum width of the energizing pulse will be different for the two modes. However, the optimization is not critical and thus satisfactory results for both modes can be obtained with a single pulse width between the two exact optimums.

Figure 9:
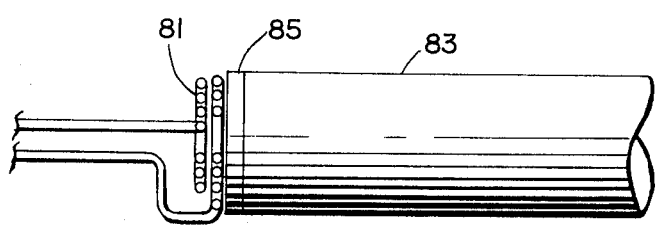
FIG. 9 is a side view in section of an embodiment employing a pancake energizing coil.

The transducer illustrated in FIG. 9 generates waves in the radial transverse shear mode in accordance with the present invention. A pancake or spiral coil 81 is mounted adjacent one end of a transducer rod 83. At least the one end of the rod 83 is constructed of a magnetostrictive material. For example, a layer 85 of nickel can be plated onto a rod of a different, non-magnetostrictive material to form a magnetostrictive portion.

Upon energizing the coil 81, with a suitable broadband pulse, e.g., a square wave pulse, the resultant radial magnetic field generates a radial shear wave in the layer 85 which is then propagated down the rod 88. Assuming the energized end of the rod is terminated essentially in free space as illustrated, a substantially unitary single pulse will be generated in manner analogous to that described with reference to the transducer of FIG. 1. The rod may be supported by various conventional means known in the art so as not to produce an acoustic discontinuity.

Figure 10:
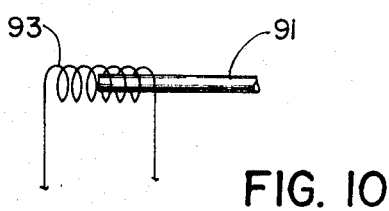
FIG. 10 is a diagram of an arrangement facilitating a variable pulse width.

As suggested previously, it is the effective length of the energizing coil which should be approximately matched to one-half the acoustic wavelength corresponding to the predetermined pulse duration. Thus, pulses of different length can be used by varying the effective length without varying the actual length. For example, a shorter effective length can be obtained as illustrated in FIG. 10 by having a magnetostrictive rod 91 extend only part way into a helical coil 93 as illustrated. Further, the effective length, that is, the length over which substantial transduction occurs, can be varied by varying the overlap of coil in the rod. Thus, the transducer can be in effect tuned to a particular pulse width.

In summary, it can thus be seen that the invention is characterized by the generation of an acoustic pulse essentially at the end of a magnetostrictive rod which is terminated by an impedance which is widely disparate from the characteristic impedance of the rod itself.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for generating interrogating acoustic broadband pulses of predetermined duration for acoustically detecting variations in a given parameter by measuring the transmission of said pulses in a suitable sensor material in which the propagation of said pulses is variable as a function of the value of said parameter, said apparatus comprising:

a transducer rod whose transverse dimensions are substantially smaller than the wavelength of pulses of said predetermined duration in said rod and whose length is substantially greater than that wavelength, at least one end of said rod being constructed of magnetostrictive material;

means for providing a terminating impedance at said one end of said rod which is widely disparate from the characteristic acoustic impedance of said rod;

a coil mounted coaxially with said rod at said one end thereof for generating interrogating acoustic pulses of said predetermined duration in said rod, said coil being configured to produce a magnetic field causing transduction in a portion of said rod which is substantially one-half wavelength;

means for applying discrete electrical broadband pulses of said predetermined duration to said coil thereby to generate discrete acoustic wave pulses in said rod; and a lead-in assembly coupled to the other end of said rod for conveying said interrogating pulses to said sensor.

2. Apparatus as set forth in claim 1 wherein said coil is around said one end of said rod and wherein the effective length of said coil is substantially equal to half said wavelength.

3. Apparatus as set forth in claim 1 wherein said rod is tubular and said coil is within said tubular rod.

4. Apparatus as set forth in claim 3 wherein the interior of said tubular rod is threaded and the turns of said coil fit within those threads.

5. Apparatus as set forth in claim 1 wherein said one end of said rod is effectively supported in free space thereby to provide a reflection coefficient substantially equal to minus one.

6. Apparatus as set forth in claim 1 wherein said one end of said rod is in acoustic contact with a relatively massive terminating element thereby to provide a reflection coefficient substantially equal to plus one.

7. Apparatus as set forth in claim 1 wherein said coil is of a pancake configuration and is positioned adjacent said one end for generating radial shear waves in said rod.

8. Apparatus as set forth in claim 7 wherein said rod comprises a layer of magnetostrictive material at said one end of a rod the major portion of which is constructed of a nonmagnetostrictive material.

9. Apparatus for acoustically detecting variations in a given parameter by means of interrogating acoustic pulses of predetermined duration, the transmission of said pulses in a suitable sensor material being variable as a function of the value of said parameter, said apparatus comprising:
- a magnetostrictive transducer rod whose transverse dimensions are substantially smaller than the wavelength of pulses of said predetermined duration in said rod and whose length is substantially greater than that wavelength;
- means for supporting one end of said rod, said supporting means providing a terminating impedance at said one end which is widely disparate from the characteristic acoustic impedance of said rod;
- a coil mounted around said one end of said rod for generating interrogating acoustic pulses of said predetermined duration in said rod, the effective length of said coil encompassing said one end of the rod and being substantially equal to half the wavelength of said pulses in said rod;
- means for applying discrete broadband electrical pulses of said predetermined duration to said coil thereby to generate discrete interrogating acoustic wave pulses in said rod and for receiving reflections of said wave pulses; and
- a sensor assembly coupled to the other end of said rod for providing reflections of said interrogating pulses which vary as a function of the value of said parameter.

10. Apparatus as set forth in claim 9 wherein said one end of said rod is threaded and said supporting means lightly engages said threads on said rod.

11. Apparatus as set forth in claim 10 wherein said supporting means comprises a tube having a crimped portion engaging said rod.

12. Apparatus as set forth in claim 11 wherein said winding is wound on said tube.

13. Apparatus as set forth in claim 9 wherein said rod extends substantially beyond said winding and comprises an acoustic lead-in for coupling pulses to said sensor.

14. Apparatus as set forth in claim 9 wherein said rod terminates at said one end in a sharp, substantially right-angle bend and said supporting means engages the portion extending at right angles to the portion within said winding.

15. Apparatus for acoustically detecting variations in a given parameter by means of interrogating acoustic pulses of predetermined duration, the transmission of said pulses in a suitable sensor material being variable as a function of the value of said parameter, said apparatus comprising:
- a magnetostrictive transducer rod whose transverse dimensions are substantially smaller than the wavelength of pulses of said predetermined duration in said rod and whose length is substantially greater than that wavelength, one end of said rod being threaded;
- a tube having a portion of reduced diameter which is internally threaded for supporting said one end of said rod and providing a substantially short circuit acoustic terminating impedance at said one end;
- a coil mounted wound around said tube at said one end of said rod for generating interrogating acoustic pulses of said predetermined duration in said rod, the effective length of said coil encompassing said one end of the rod and being substantially equal to half the wavelength of said pulses in said rod;
- means for applying discrete broadband electrical pulses of said predetermined duration to said coil thereby to generate discrete interrogating acoustic wave pulses in said rod and for receiving reflections of said wave pulses; and
- a sensor assembly coupled to the other end of said rod for providing reflections of said interrogating pulses which vary as a function of the value of said parameter.

16. An acoustic transducer comprising:
a pair of coaxial magnetostrictive elements;
an acoustic lead-in member coaxial with said elements, one end of each element being acoustically coupled to said lead-in member;
means for terminating the other end of one of said elements with a high acoustic impedance thereby to provide a reflection coefficient substantially equal to plus one, the other end of the other element being essentially free to provide a reflection coefficient substantially equal to minus one; and
electromagnetic coil means adjacent the said other ends of said elements for generating acoustic pulses of substantially predetermined wavelength in said elements, the effective length of said coil means being substantially equal to half said wavelength, the acoustic pulses generated in the two elements combining at said lead-in member.

17. Apparatus for generating interrogating acoustic pulses of predetermined duration for acoustically detecting variations in a given parameter by measuring the transmission of said pulses in a suitable sensor material in which the propagation of said pulses is variable as a function of the value of said parameter, said apparatus comprising:
- a magnetostrictive transducer rod whose transverse dimensions are substantially smaller than the wavelength of pulses of said predetermined duration in said rod and whose length is substantially greater than that wavelength;
- means for supporting one end of said rod, said supporting means providing a terminating impedance at said one end which is widely disparate from the characteristic acoustic impedance of said rod;
- a coil for generating interrogating acoustic pulses of said predetermined duration in said rod, said one end of said rod extending part way into said coil with the effective length of said coil acting on said rod being preselected to be substantially equal to half the wavelength of said pulses in said rod;
- means for applying discrete electrical broadband pulses of said predetermined duration to said coil thereby to generate discrete acoustic wave pulses in said rod; and
- a lead-in assembly coupled to the other end of said rod for conveying said interrogating pulses to said sensor.

* * * * *